(12) United States Patent
Kim et al.

(10) Patent No.: US 12,409,814 B2
(45) Date of Patent: Sep. 9, 2025

(54) PEDAL SIMULATOR OF VEHICLE

(71) Applicant: HYUNDAI MOBIS CO., LTD., Seoul (KR)

(72) Inventors: Jin Hyun Kim, Yongin-si (KR); Myeon Gyu Cha, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 18/606,561

(22) Filed: Mar. 15, 2024

(65) Prior Publication Data
US 2025/0100517 A1   Mar. 27, 2025

(30) Foreign Application Priority Data
Sep. 26, 2023   (KR) .................. 10-2023-0129131

(51) Int. Cl.
| | |
|---|---|
| *B60T 7/06* | (2006.01) |
| *B60T 7/04* | (2006.01) |
| *G05G 5/03* | (2008.04) |
| *G05G 5/05* | (2006.01) |

(52) U.S. Cl.
CPC ............. *B60T 7/06* (2013.01); *B60T 7/042* (2013.01); *G05G 5/03* (2013.01); *G05G 5/05* (2013.01); *G05G 2505/00* (2013.01)

(58) Field of Classification Search
None
See application file for complete search history.

(56) References Cited

U.S. PATENT DOCUMENTS

2022/0332296 A1*   10/2022   Eriksen .................... G05G 1/46
2022/0396255 A1*   12/2022   Schlangen .............. B60T 17/08

FOREIGN PATENT DOCUMENTS

KR          10-2223847 B1        3/2021

* cited by examiner

*Primary Examiner* — Vicky A Johnson
(74) *Attorney, Agent, or Firm* — Morgan, Lewis & Bockius LLP

(57) ABSTRACT

The present disclosure relates to a pedal simulator of a vehicle, the pedal simulator includes a piston part slidably disposed in the housing part, an elastic part elastically supporting the piston part within the housing part, a damper part provided in the piston part and compressed onto the housing part by a contact, and a hollow cap part combined with the piston part and interposed between the piston part and the damper part.

20 Claims, 8 Drawing Sheets

PEDAL SIMULATOR OF VEHICLE

CROSS-REFERENCE TO RELATED APPLICATION

This application claims priority from and the benefit of Korean Patent Application No. 10-2023-0129131, filed on Sep. 26, 2023, which is hereby incorporated by reference for all purposes as if set forth herein.

BACKGROUND

Field

Exemplary embodiments of the present disclosure relate to a pedal simulator of a vehicle, and more particularly, to a pedal simulator of a vehicle that may provide a braking sense.

Discussion of the Background

In general, a hydraulic system has been applied to an electro mechanical brake. Recently, as technologies related to a brake-by-wire system and an autonomous vehicle are emerging, a non-hydraulic brake system needs to be developed.

A pedal simulator is a part that is mounted on an electro mechanical brake or an electronic booster (VEB), and provides a driver with a braking sense that is generated from the existing mechanical (hydraulic) brake.

A conventional pedal simulator uses a plurality of springs and dampers in order to provide a braking sense like a mechanical booster. However, the conventional pedal simulator has problems with an increase of the number of parts and an increase of shape complexity that are required to increase similarity with the mechanical booster.

The Background technology of the present disclosure is disclosed in Korean Patent No. 10-2223847 (issued on Mar. 8, 2021 and entitled "PEDAL SIMULATOR").

SUMMARY

Various embodiments are directed to providing a pedal simulator of a vehicle, which has an optimized structure and a simplified shape.

Furthermore, various embodiments are directed to providing a pedal simulator of a vehicle, which may be applied regardless of the type and shape of a pedal.

In an embodiment, a pedal simulator of a vehicle may include a housing part, a piston part slidably disposed in the housing part, an elastic part elastically supporting the piston part within the housing part, a damper part provided in the piston part and compressed onto the housing part by a contact, and a hollow cap part combined with the piston part and interposed between the piston part and the damper part.

The piston part may include a piston body part located within the housing part and provided with a ball part, a piston pressurization part mounted on one side of the piston body part and provided with a socket part rotatably combined with the ball part, and a piston rod part mounted on a second side of the piston body part and configured to have the damper part and the cap part mounted thereon.

The piston rod part may be provided with an opening at an end of one side thereof, and may be formed in a hollow form.

The damper part may be received within the piston rod part and may include an elastically deformable material.

The cap part may include a contact part coming in contact with a first part of the damper part to restrict the deformation of the first part, a non-contact part spaced apart from a second part of the damper part to allow the deformation of the second part, and a flange part mounted on an end of one side of the piston rod part.

The housing part may include a hollow part in which the piston part is movably received, a screw part that is screw-combined with the hollow part and includes a middle room part with which the damper part comes into contact or does not come into contact depending on a moving direction of the piston part, and the guide part that is mounted on the outside of the middle room part and communicates with the hollow part, and into which the piston rod part is inserted.

The diameter of the piston body part may be formed to be greater than the diameter of the piston rod part.

The elastic part may have one side that comes into contact with the inner surface of the hollow part and the other side that comes into contact with the outer surface of the piston body part, and may provide an elastic force to the piston body part.

A slit hole part penetrating an outer circumferential surface of the housing part may be provided. The pedal simulator of the vehicle may further include a retainer part penetrating the slit hole part to be combined with the housing part and interfering with the piston pressurization part to prevent the separation of the piston part.

The retainer part may be formed in a ring form with one open side.

The piston part may further include a magnet part mounted on an outer circumferential surface of the piston body part and formed in a circumferential direction of the piston body part.

The pedal simulator of the vehicle may further include a sensor part provided in the housing part and configured to detect a location of the magnet part.

The damper part may be formed in a hollow form.

The damper part may further include a protrusion part formed in the outer surface of the damper part in a way to protrude therefrom.

The protrusion parts may be disposed in a plural number in the circumferential direction of the damper part by being spaced apart from each other.

A pedal simulator of the vehicle according to the present disclosure includes a housing part detachably combined with a pedal part, a piston part slidably disposed in the housing part, and a damper part provided in the piston part and compressed onto the housing part by a contact thereto.

The pedal simulator may further include a bracket part provided in the housing part and combined with the pedal part.

The bracket parts may be disposed on the outer surface of the housing part in a plural number by being spaced apart from each other.

The present disclosure has an effect in that a pedal return spring can be deleted by the elastic part that elastically supports the piston part.

Furthermore, the present disclosure has effects in that repair and replacement costs for the pedal simulator can be reduced and productivity can be improved because the pedal simulator of the present disclosure can be used in various types of pedal parts in common through the modulation of the pedal simulator which may be applied regardless of the type and shape of the pedal part.

Furthermore, the present disclosure has an effect in that a pedal effort of the pedal simulator may be adjusted by lengths, external diameters, hardness, and the like of the housing part, the elastic part, and the damper part.

Furthermore, the present disclosure has an effect of measuring a pedal stroke by a magnet part integrally provided in the piston part.

DETAILED DESCRIPTION

Figure 1:
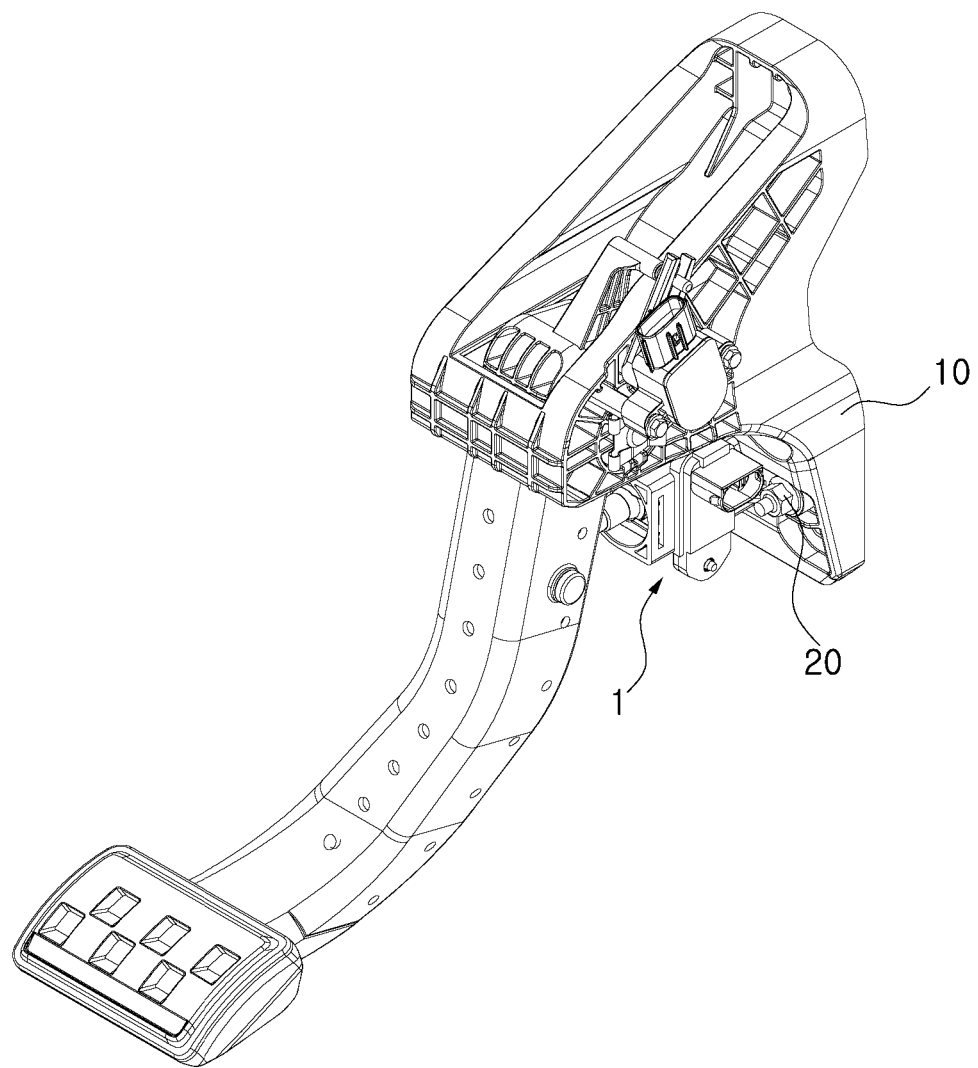
FIG. 1 is a perspective view illustrating the state in which a pedal simulator of a vehicle according to an embodiment of the present disclosure is mounted on a pendant type pedal part.

Hereinafter, a pedal simulator of a vehicle according to an embodiment of the present disclosure will be described Referring to the accompanying drawings. In this process, thicknesses of lines illustrated in the drawings or sizes of constituent elements may be exaggerated for clarity and convenience of description. Furthermore, the terms used below are defined in consideration of the functions thereof in the present disclosure and may vary depending on the intention of a user or an operator or a usual practice. Accordingly, the definition of the terms should be made based on the entire contents of the present specification.

FIG. 1 is a perspective view illustrating a state in which a pedal simulator of a vehicle according to an embodiment of the present disclosure is mounted to a pendant type pedal part.

Referring to FIG. 1, a pedal simulator 1 of a vehicle according to an embodiment of the present disclosure may be detachably mounted regardless of the type and shape of a pedal part 10, such as a pendant type pedal part or an organ type pedal part. Accordingly, the pedal simulator 1 of the present disclosure may be modulated, may be conveniently assembled and mounted on the pedal part 10, such as a pendant type pedal part or an organ type pedal part, and may be used in common.

In the pedal simulator 1 of the present disclosure, a bracket part 150 provided in a housing part 100 may be conveniently assembled by being combined with a pendant type pedal part or an organ type pedal part through the medium of a coupling member 20, such as a bolt or a nut.

Figure 2:
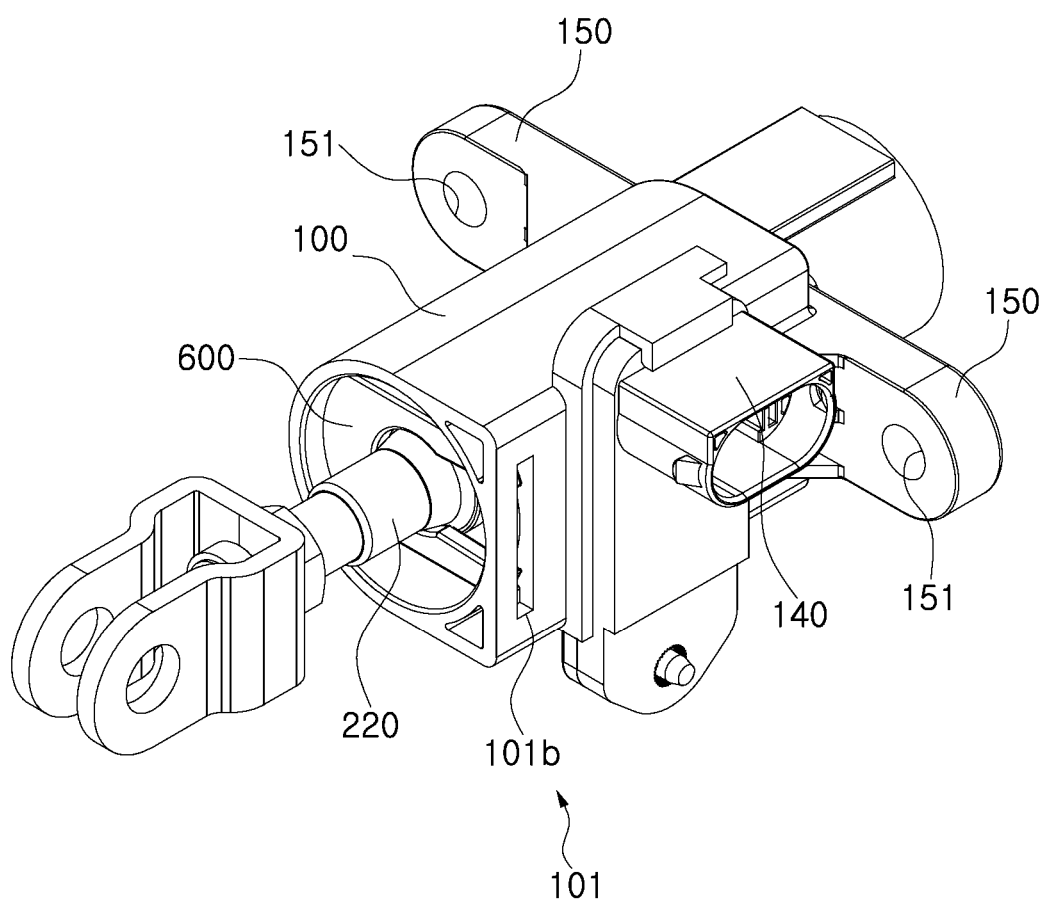
FIG. 2 is an outside perspective view illustrating the pedal simulator of the vehicle according to an embodiment of the present disclosure when viewed from one direction.
Figure 3:
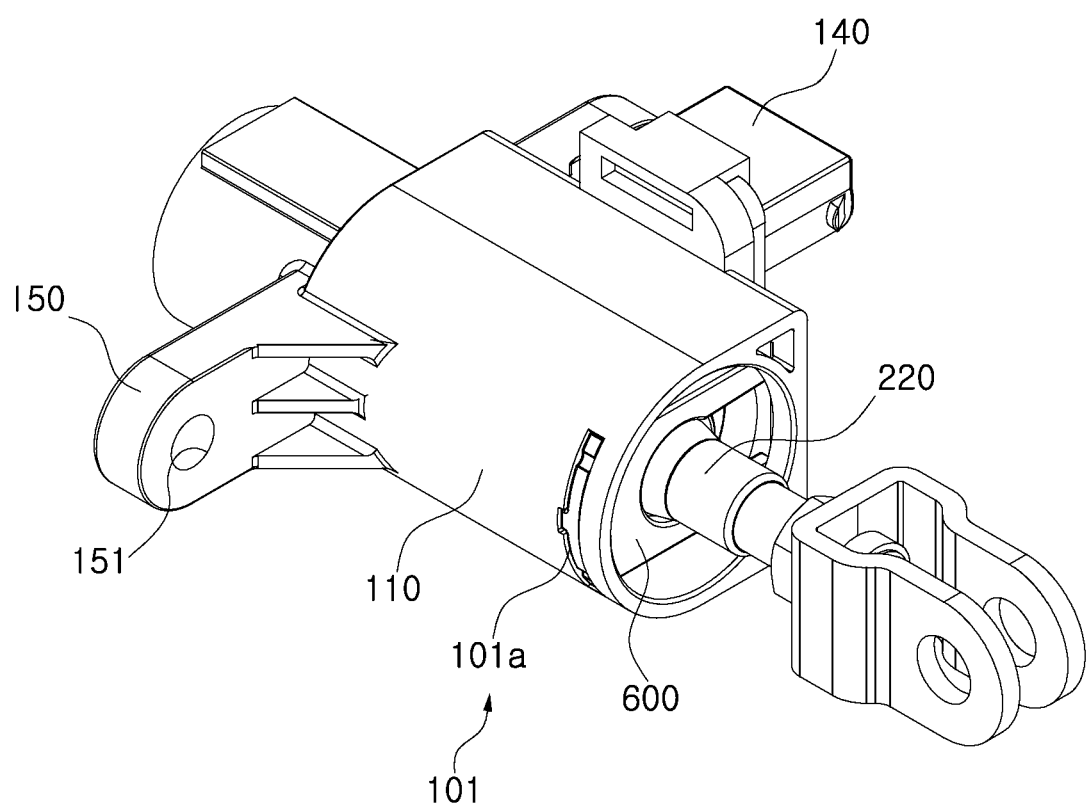
FIG. 3 is an outside perspective view illustrating the pedal simulator of the vehicle of FIG. 2 when viewed from another direction.
Figure 4:
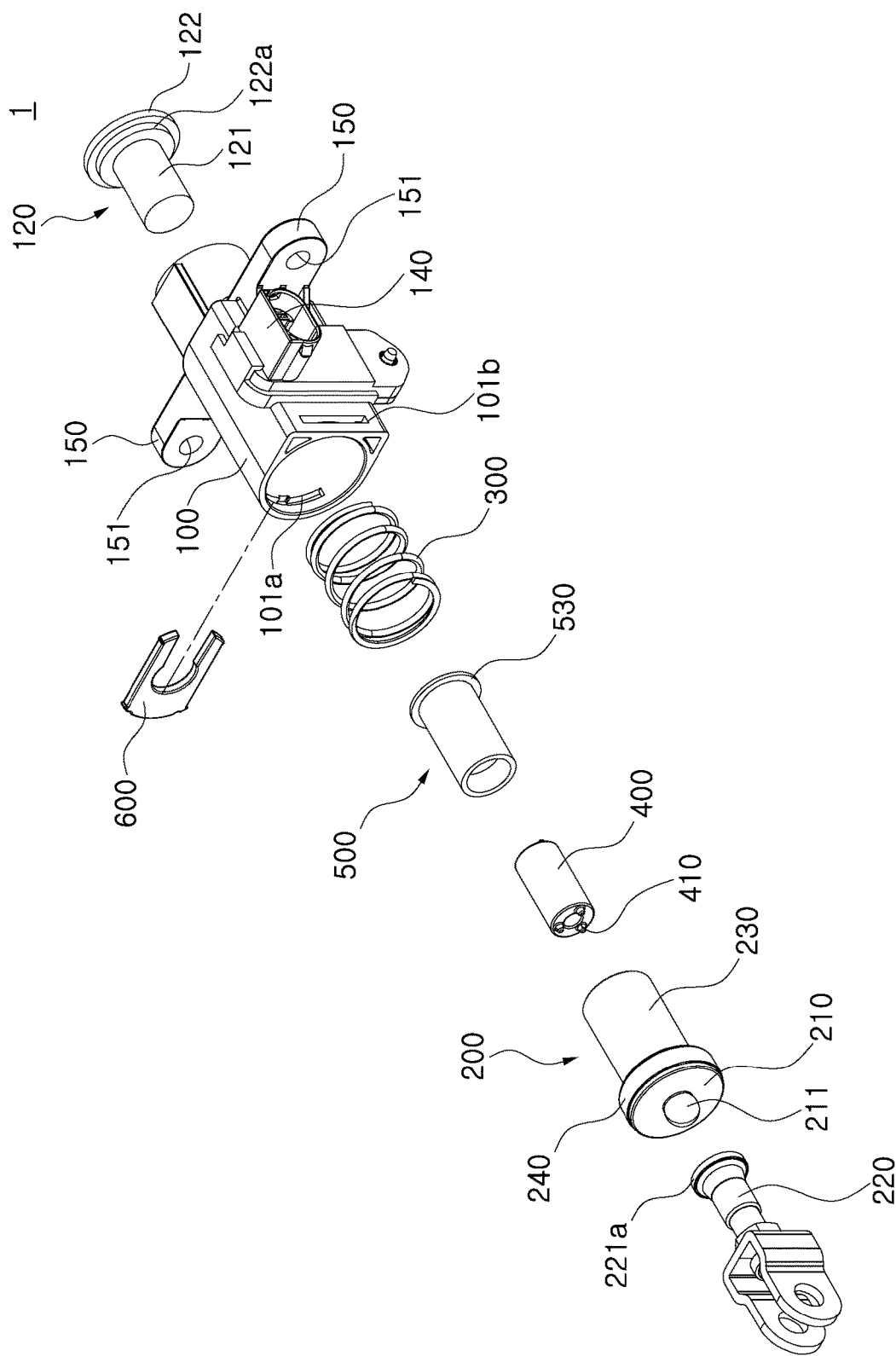
FIG. 4 is an exploded perspective view illustrating the pedal simulator of the vehicle according to an embodiment of the present disclosure when viewed from one direction.
Figure 5:
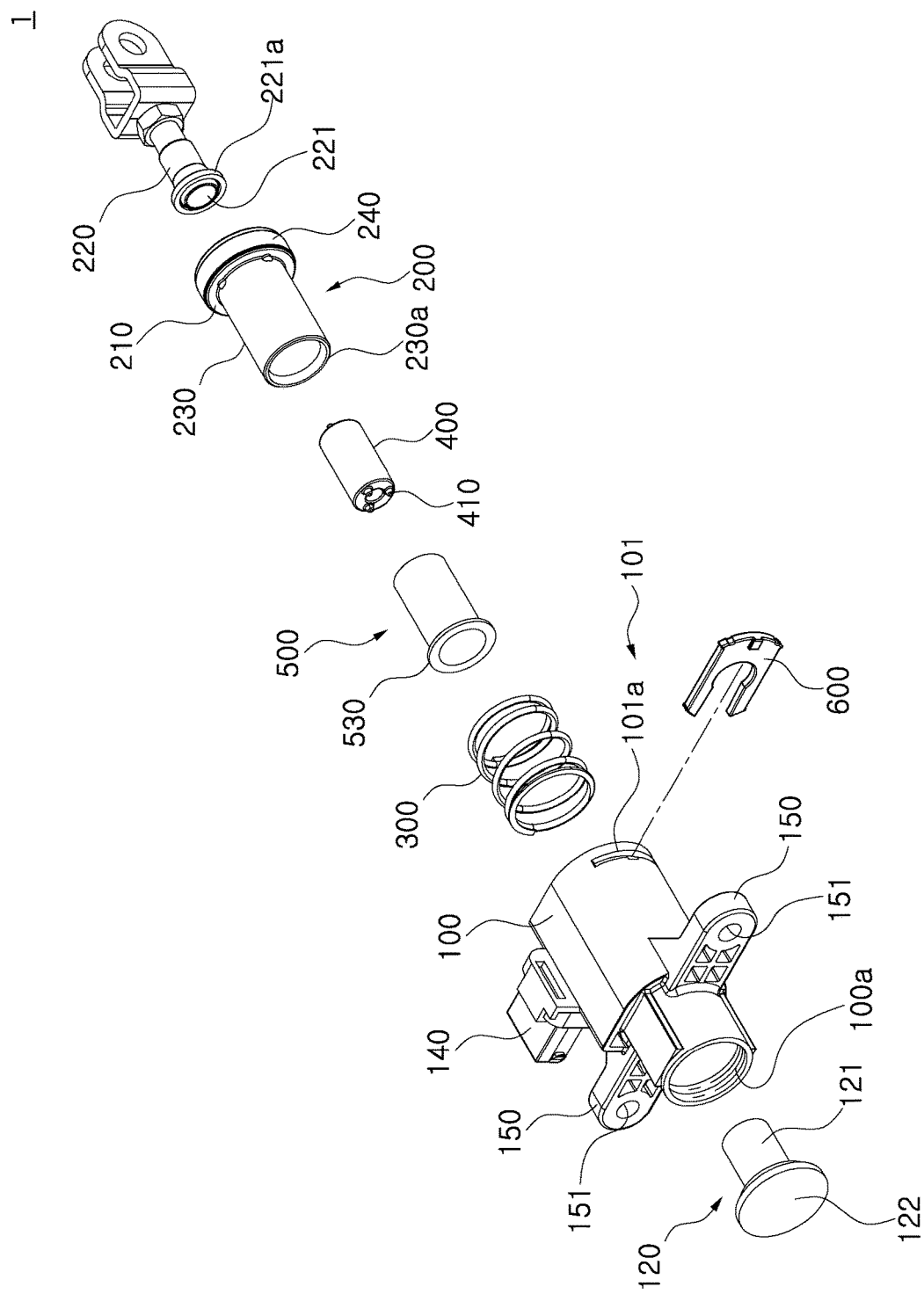
FIG. 5 is an exploded perspective view illustrating the pedal simulator of the vehicle of FIG. 4 when viewed from another direction.
Figure 6:
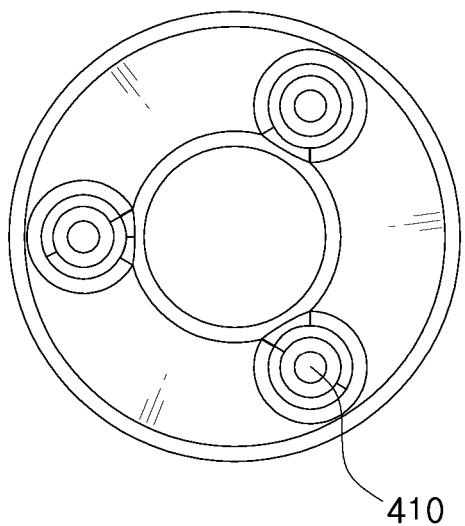
FIG. 6 is a front view illustrating a damper part in the pedal simulator of the vehicle according to an embodiment of the present disclosure.

FIG. 2 is an outside perspective view illustrating the pedal simulator of the vehicle according to an embodiment of the present disclosure when viewed from one direction. FIG. 3 is an outside perspective view illustrating the pedal simulator of the vehicle of FIG. 2 when viewed from another direction. FIG. 4 is an exploded perspective view illustrating the pedal simulator of the vehicle according to an embodiment of the present disclosure when viewed from one direction. FIG. 5 is an exploded perspective view illustrating the pedal simulator of the vehicle of FIG. 4 when viewed from another direction. FIG. 6 is a front view illustrating a damper part in the pedal simulator of the vehicle according to an embodiment of the present disclosure.

Referring to FIGS. 2 to 8, the pedal simulator 1 of the vehicle according to an embodiment of the present disclosure includes the housing part 100, a piston part 200, an elastic part 300, a damper part 400, and a cap part 500, which are described in detail as follows.

The housing part 100 may include a hollow part 110, a screw part 120, and a guide part 130.

The hollow part 110 is provided within the housing part 100, and is formed in the form of a hollow having a set length. The piston part 200 described later may be movably received in the hollow part 110.

The hollow part 110 may provide guidance to the straight movement of a piston body part 210. An opening that communicates with the hollow part 110 is provided on an outer surface (the left/right sides of FIG. 7) of the housing part 100. The hollow part 110 may be formed as a hole having a cylindrical shape.

The hollow part 110 may include a first hollow part 111, and a second hollow part 112 having the smaller inner diameter than the inner diameter of the first hollow part 111. Accordingly, a height difference part, which is stepped in a curved manner toward the inside of the housing part 100, may be formed between the first hollow part 111 and the second hollow part 112. The elastic part 300 described later may be mounted on the height difference part described later.

A first thread part 100a, to which the screw part 120 described later is screw-coupled, may be provided in the hollow part 110. A screw thread is formed in the first thread part 100a. The first thread part 100a may be located on an inner circumferential surface of one side (the right side of FIG. 7) of the second hollow part 112.

The screw part 120 may be screw-combined with the hollow part 110. The screw part 120 may include a middle room part 121 inserted into the inside of the second hollow part 112, a head part 122 integrally provided in the middle room part 121 and seated on an end of one side of the second hollow part 112, and a second thread part 122a integrally provided between the middle room part 121 and the head part 122 and having an outer circumferential surface formed with the screw thread to be screw-combined with the first thread part 100a.

The screw part 120, which is screw-combined with the housing part 100, may be moved forward or backward in an axial direction of the housing part 100. The forward or backward movement of the screw part 120 in the axial direction may allow the adjustment of an effective stroke of the middle room part 121. Furthermore, this movement may also adjust the contact point of the damper part 400, described later, coming in contact with the middle room part 121 of the screw part 120.

The middle room part 121 may be formed in a middle room form having a predetermined length. Furthermore, the diameter of the second hollow part 112 may be formed to be greater than the diameter of the middle room part 121. The diameter of the second thread part 122a may be formed to be greater than the diameter of the middle room part 121. The diameter of the head part 122 may be formed to be greater than the diameter of the second thread part 122a.

The guide part 130 is provided within the housing part 100, and is provided on the outside of the middle room part 121. Incidentally, the guide part 130 is provided between the housing part 100 and the middle room part 121, and is formed in the circumferential direction of the middle room part 121. The guide part 130 may communicate with the first hollow part 111, and may provide guidance to the straight movement of a piston rod part 230 described later.

The housing part 100 may be detachably combined with the pedal part 10, such as a pendant type pedal part or an organ type pedal part. The housing part 100 includes a bracket part 150 that is combined with the pedal part 10. The bracket part 150 may be formed in the outer surface of the housing part 100 in a way to protrude therefrom, and may be provided in a plural number by being spaced apart from each other.

The bracket part 150 may include a through hole part 151. The through hole part 151 is formed to penetrate the bracket part 150. The bracket part 150 is combined with a coupling hole that is formed in the pedal part 10 through the medium of the coupling member 20, such as a bolt or a nut, so that the housing part 100 may maintain the state in which the housing part 100 has been stably combined with the pedal part 10 and the rotation of the housing part 100 may be prevented.

A sensor part 140 may be further provided in the housing part 100. The sensor part 140 may be mounted on an outer surface of the housing part. The sensor part 140 may be electrically connected to a controller (not illustrated) of a vehicle, and may detect a location of a magnet part 240 described later.

The piston part 200 is slidably disposed in the housing part 100. The piston part 200 may include a piston body part 210, a piston pressurization part 220, and a piston rod part 230.

The piston body part 210 is located within the housing part 100. The piston body part 210 is disposed within the housing part 100. The piston body part 210 may be received in the hollow part 110. Incidentally, the piston body part 210 may be movably received in the first hollow part 111. Incidentally, the piston body part 210 may be formed in the shape of a flat plate.

A spherical ball part 211 may be provided in the piston body part 210. The ball part 211 may be formed to protrude from an outer surface of the piston body part 210 toward the piston pressurization part 220 described later. A socket part 221 of the piston pressurization part 220 may be combined with the ball part 211.

The piston pressurization part 220 is mounted on the piston body part 210. Incidentally, the piston pressurization part 220 is mounted on the ball part 211. The piston pressurization part 220 is moved toward one side (the right side of FIG. 2) when an external force is applied to the piston pressurization part 220.

The piston pressurization part 220 may be rotatably combined with the piston body part 210 in a joint manner. Incidentally, the socket part 221 provided in the piston pressurization part 220 may be rotatably combined with the ball part 211 provided in the piston body part 210.

Furthermore, the piston body part 210 may be combined with the piston pressurization part 220 by caulking. For example, the piston pressurization part 220 that is moved by an external force may maintain the state in which the piston pressurization part 220 is rotatably combined in the ball part 211 by pressurizing and caulking the opening of the socket part 221 toward the piston body part 210. Furthermore, the piston body part 210 is caulked into the piston pressurization part 220, so that an assembly time and cost may be reduced.

The piston rod part 230 is provided on one side (the right side of FIG. 4) of the piston body part 210. Incidentally, the piston rod part 230 is formed in the outer surface of the piston body part 210.

The piston rod part 230 may be movably received in the hollow part 110, and may be inserted into the guide part 130. The diameter of the piston body part 210 may be formed to be greater than the diameter of the piston rod part 230.

An opening 230a may be formed at the end (the left side of FIG. 5) of one side of the piston rod part 230, which is directed toward the middle room part 121. The piston rod part 230 may be formed in the form of a hollow. The piston rod part 230 may be formed in the form of a cylindrical shape having a set length. The damper part 400 described later and the cap part 500 may be mounted on the piston rod part 230.

The magnet part 240 may be provided in the piston part 200. Furthermore, the magnet part 240 may be provided on the outer circumferential surface of the piston body part 210. The magnet part 240 may be inserted and ejected and integrally formed in the piston body part 210.

The magnet part 240 may be formed in the circumferential direction of the piston body part 210. Accordingly, a location of the magnet part 240 may be detected regardless of a mounting location of the sensor part 140 mounted on the housing part 100.

The magnet part 240 may measure information on the location of the piston part 200. The magnet part 240 is a magnet having a magnetic force, and may transmit a pedal effort that is pressurized by the piston part 200 or information on the location of the piston part 200 to the controller of the vehicle through the sensor part 140 based on a change in the magnetic field, which occurs as the magnet part 240 is moved along with the piston part 200.

The elastic part 300 elastically supports the piston part 200 within the housing part 100. Incidentally, the elastic part 300 elastically supports the piston part 200 in the hollow part 110.

The elastic part 300 has one side (the right side of FIG. 7) that comes into contact with the inner surface of the hollow part 110 and the other side (the left side of FIG. 7) that comes into contact with the outer surface of the piston body part 210, and provides an elastic force to the piston body part 210 that is moved by an external force applied to the piston pressurization part 220.

The elastic part 300 is interposed between the piston body part 210 and the second hollow part 112, and is compressed by the piston body part 210 that is moved by an external force applied to the piston pressurization part 220. The compressed elastic part 300 provides an elastic force (or an elastic restoring force) to the piston body part 210 so that the piston body part 210 returns to its original location. The elastic part 300 may be a coil spring that surrounds the outside of the piston rod part 230.

The damper part 400 is provided in the piston part 200. Incidentally, the damper part 400 is received within the piston rod part 230. Incidentally The damper part 400 may be fabricated to include an elastically deformable material, and may be received within the piston rod part 230 through the opening 230a of the piston rod part 230. The end of one side of the damper part 400 may be exposed from the piston rod part 230 through the opening 230a of the piston rod part 230.

The damper part 400 may be conveniently assembled because the damper part 400 is combined with the piston part 200. The damper part 400 may include rubber, silicon, or plastic as the elastically deformable material.

The damper part 400 is moved along with the piston part 200 and is compressed onto the housing part 100 by a contact thereto. Incidentally, the damper part 400 comes into contact with or does not come into contact with the middle room part 121 depending on a moving direction of the piston part 200.

When the piston rod part 230 moves toward the screw part 120 by an external force that is applied to the piston pressurization part 220, the damper part 400 comes into contact with the outer surface of the middle room part 121. When the piston rod part 230 is inserted into the guide part 130, the damper part 400 is compressed between the inner surface of the piston rod part 230 and the middle room part 121.

The damper part 400 may be formed in the form of a hollow the inside of which is empty. Openings that communicate with the internal space of the damper part 400 may be provided at both ends of the damper part 400, respectively.

The damper part 400 may further include a protrusion part 410. The protrusion parts 410 may be formed in the outer surface of the damper part 400 in a way to protrude therefrom. The protrusion parts 410 may be provided at both ends of the damper part 400, respectively.

The protrusion parts 410 may be provided on one side (the left side of FIG. 7) of the damper part 400, which is directed toward the inside of the piston rod part 230, and one side (the right side of FIG. 7) of the damper part, which is directed toward the middle room part 121, respectively. The protrusion parts 410 may be disposed in a plural number in the circumferential direction of the damper part 400 by being spaced apart from each other.

The cap part 500 is combined with the piston part 200. The cap part 500 is formed in a hollow form with both open ends, and is interposed between the piston part 200 and the damper part 400. The cap part 500 may include a contact part 510, a non-contact part 520, and a flange part 530.

The contact part 510 is inserted into the piston rod part 230 through the opening 230*a* of the piston rod part 230. The contact part 510 may be interposed between an inner circumferential surface of the piston rod part 230 and the damper part 400, and may come into contact with a first part 400*a* of the damper part 400. The contact part 510 may restrict the deformation of the first part 400*a* when the damper part 400 is compressed and deformed.

The non-contact part 520 is integrally provided in the contact part 510, and, similarly to the contact part 510, is inserted into the inside of the piston rod part 230 through the opening 230*a* of the piston rod part 230. The inner diameter of the non-contact part 520 may be formed to be greater than the inner diameter of the contact part 510. Accordingly, the non-contact part 520 may be spaced apart from a second part 400*b* of the damper part 400, and may not come into contact with the second part 400*b* of the damper part 400.

The non-contact part 520 may allow the deformation of the second part 400*b* when the damper part 400 is compressed and deformed. Incidentally, the non-contact part 520 may allow the deformation of the second part 400*b* so that the volume of the second part 400*b* may extend when the damper part 400 is compressed and deformed.

The flange part 530 may be seated on an end of one side (the right side of FIG. 7) of the piston rod part 230. The flange part 530 may be provided on an end of the non-contact part 520, and may have the same diameter as the piston rod part 230.

The pedal simulator 1 of the vehicle according to an embodiment of the present disclosure may further include a retainer part 600.

The housing part 100 may be provided with a slit hole part 101. The slit hole part 101 may be formed to penetrate the outer circumferential surface of the housing part 100. The slit hole part 101 may include a first slit hole part 101*a* and a second slit hole part 101*b* that is located on the opposite side of the first slit hole part 101*a*.

The retainer part 600 may be formed in a ring form with one open side. The retainer part 600 may pass through the first slit hole part 101*a*, and a free end of the retainer part 600 may be inserted into the inside of the second slit hole part 101*b* so that the retainer part 600 is combined with the housing part 100.

The retainer part 600 interferes with the piston pressurization part 220 to prevent axial separation of the piston part 200 through an opening of the housing part 100.

An operating process of the pedal simulator of the vehicle having the aforementioned construction according to an embodiment of the present disclosure is described as follows.

Figure 7:
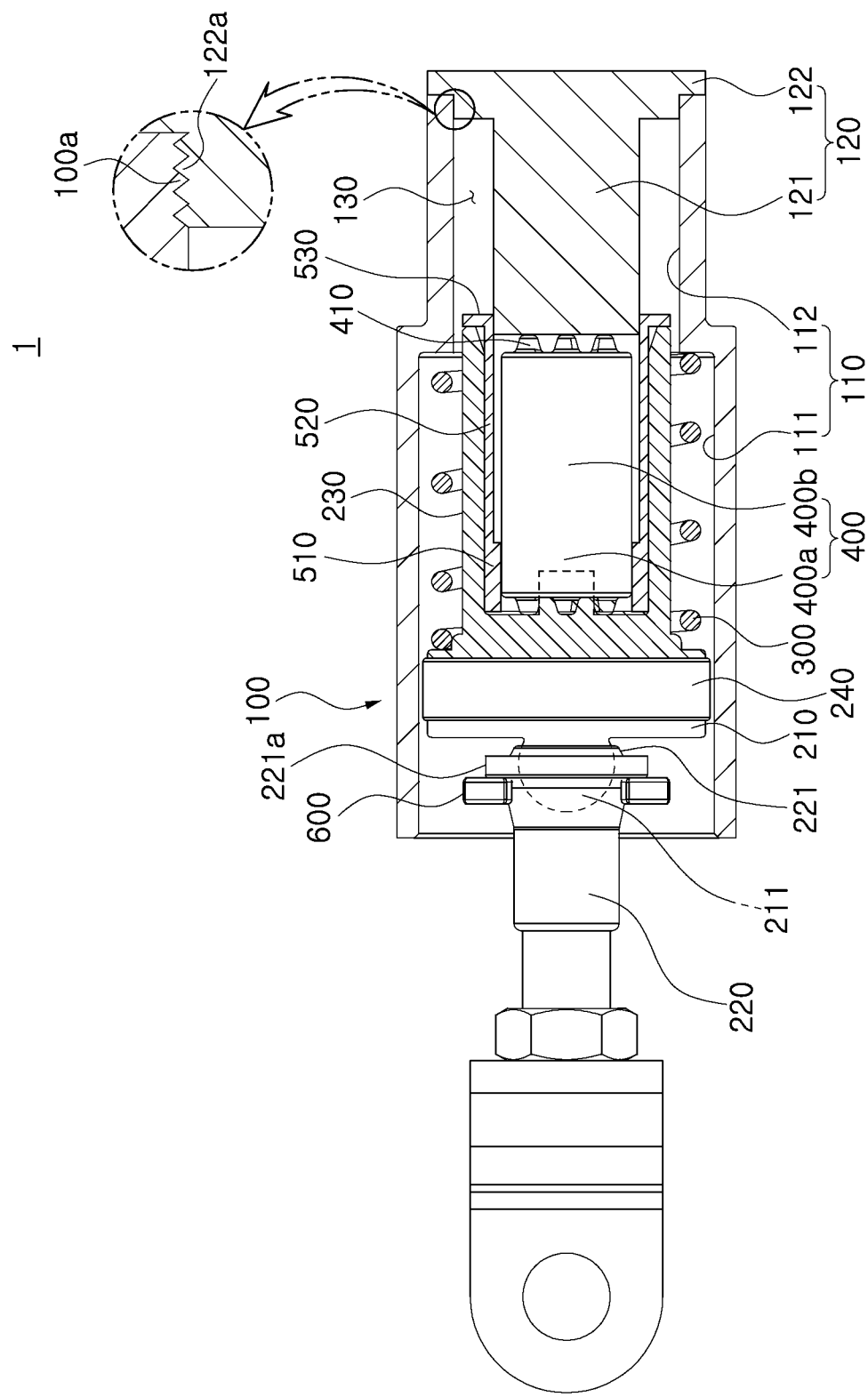
FIG. 7 is a cross-sectional view illustrating initial braking of the pedal simulator of the vehicle according to an embodiment of the present disclosure.
Figure 8:
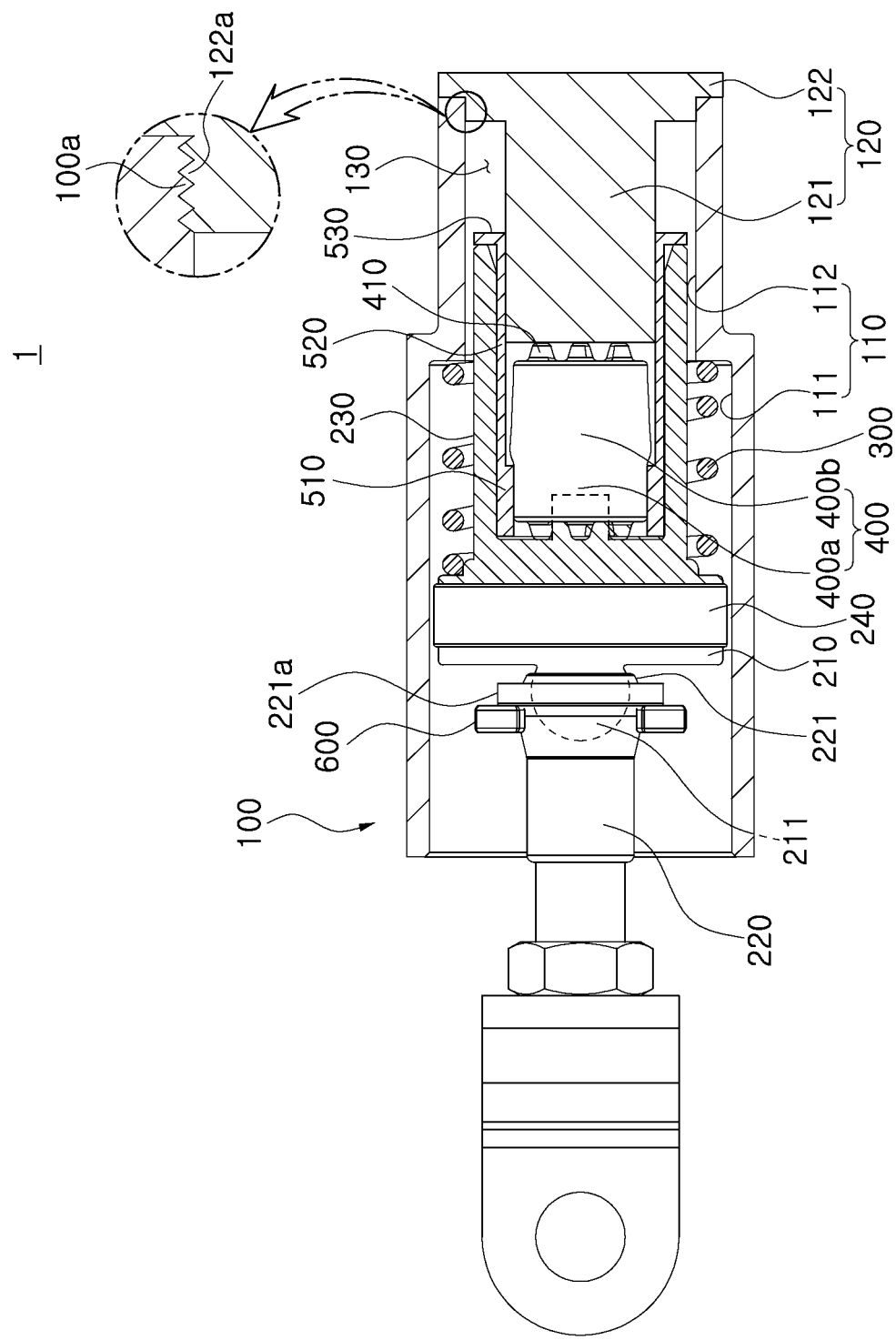
FIG. 8 is a cross-sectional view illustrating middle and latter braking of the pedal simulator of the vehicle according to an embodiment of the present disclosure.

FIG. 7 is a cross-sectional view illustrating initial braking of the pedal simulator of the vehicle according to an embodiment of the present disclosure. FIG. 8 is a cross-sectional view illustrating middle and latter braking of the pedal simulator of the vehicle according to an embodiment of the present disclosure.

Referring to FIG. 7, when the piston pressurization part 220 is pressurized by an external force, the piston rod part 230 is moved toward the middle room part 121. The elastic part 300 that is seated on the inner surface of the first hollow part 111 by the movement of the piston rod part 230 is compressed and deformed by the pressurization of the piston body part 210. When the elastic part 300 is compressed, a user may feel an initial braking sense.

At this time, the location of the magnet part 240 moved by the piston part 200 is detected by the sensor part 140. The sensor part 140 transmits information on the location of the piston part 200 or a pedal effort based on a change in the magnetic field to the controller of the vehicle.

Referring to FIG. 8, when the external force is continuously applied to the piston pressurization part 220 and the piston rod part 230 is inserted into the guide part 130, the damper part 400 that is moved along with the piston rod part 230 is compressed onto the middle room part 121 by a contact, and the user may feel a middle and late braking sense.

At this time, the location of the magnet part 240 moved by the piston part 200 is detected by the sensor part 140. The sensor part 140 transmits information on the location of the piston part 200 or a pedal effort based on a change in the magnetic field to the controller of the vehicle. When the external force applied to the piston pressurization part 220 is released, the compressed elastic part 300 provides an elastic force (or an elastic restoring force) to the piston body part 210 so that the piston body part 210 returns to its original location.

The pedal simulator 1 of the vehicle according to an embodiment of the present disclosure may not include a pedal return spring by the elastic part 300 that elastically supports the piston part 200.

The pedal simulator 1 of the vehicle according to an embodiment of the present disclosure may reduce repair and replacement costs for a product and improve productivity because the pedal simulator 1 of the vehicle may be used in various types of pedal parts 10 in common through the modulation of the pedal simulator 1, which may be applied regardless of the type and shape of the pedal parts 10.

The pedal simulator 1 of the vehicle according to an embodiment of the present disclosure may adjust a pedal effort by lengths, external diameters, hardness, and the like of the housing part 100, the elastic part 300, and the damper part 400.

The pedal simulator 1 of the vehicle according to an embodiment of the present disclosure may measure a pedal stroke by the magnet part 240 that is integrally provided in the piston part 200.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A pedal simulator apparatus of a vehicle, the apparatus comprising:
   a housing part;
   a piston part slidably disposed in the housing part;
   an elastic part elastically supporting the piston part within the housing part;
   a damper part provided within the piston part including a piston body part, a piston pressurization part, and a piston rod part, and compressed onto the housing part by a contact thereto; and
   a hollow cap part combined with the piston part and interposed between the piston part and the damper part.

2. The pedal simulator apparatus of claim 1, wherein:
   the piston body part is disposed within the housing part and provided with a ball part;
   the piston pressurization part is disposed on a first side of the piston body part and provided with a socket part rotatably combined with the ball part; and
   the piston rod part is mounted on a second side of the piston body part and onto which the damper part and the cap part are mounted.

3. The pedal simulator apparatus of claim 2, wherein the housing part includes:
   a hollow part in which the piston part is movably received;
   a screw part that is screw-combined with the hollow part and includes a middle room part with which the damper part selectively comes into contact depending on a moving direction of the piston part; and
   a guide part that is provided outside the middle room part, that communicates with the hollow part, and into which the piston rod part is inserted.

4. The pedal simulator apparatus of claim 3, wherein a diameter of the piston body part is greater than a diameter of the piston rod part.

5. The pedal simulator apparatus of claim 4, wherein the elastic part includes a first side that comes into contact with an inner surface of the hollow part and a second side that comes into contact with an outer surface of the piston body part, and provides an elastic force to the piston body part.

6. The pedal simulator apparatus of claim 2,
   wherein the housing part includes a slit hole part penetrating an outer circumferential surface of the housing part, and
   wherein the pedal simulator apparatus further includes a retainer part passing through the slit hole part to be combined with the housing part, and interfering with the piston pressurization part to prevent separation of the piston part.

7. The pedal simulator apparatus of claim 6, wherein the retainer part is formed in a ring form having one open side.

8. The pedal simulator apparatus of claim 2, wherein the piston part further includes a magnet part mounted on an outer circumferential surface of the piston body part, and disposed in a circumferential direction of the piston body part.

9. The pedal simulator apparatus of claim 8, further including a sensor part provided in the housing part and configured to detect a location of the magnet part.

10. The pedal simulator apparatus of claim 2, wherein the piston rod part includes an opening at an end of one side thereof, and is formed in a hollow form.

11. The pedal simulator apparatus of claim 10, wherein the damper part is received within the piston rod part and includes an elastically deformable material.

12. The pedal simulator apparatus of claim 11, wherein the cap part includes:
    a contact part coming in contact with a first part of the damper part to restrict deformation of the first part;
    a non-contact part spaced apart from a second part of the damper part to allow deformation of the second part; and
    a flange part seated on an end of one side of the piston rod part.

13. The pedal simulator apparatus of claim 12, wherein the non-contact part is integrally provided in the contact part and an inner diameter of the non-contact part is greater than an inner diameter of the contact part.

14. The pedal simulator apparatus of claim 1, wherein the damper part is formed in a hollow form.

15. The pedal simulator apparatus of claim 14, wherein the damper part further includes a protrusion part formed in an outer surface of the damper part and protruding therefrom.

16. The pedal simulator apparatus of claim 15, wherein the protrusion part is in plural and the plurality of the protrusion parts are disposed in a circumferential direction of the damper part by being spaced apart from each other.

17. A pedal simulator apparatus of a vehicle, the apparatus comprising:
    a housing part detachably combined with a pedal part;
    a piston part slidably disposed in the housing part; and
    a damper part provided within the piston part including a piston body part, a piston pressurization part, and a piston rod part and compressed onto the housing part by a contact thereto.

18. The pedal simulator apparatus of claim 17, further including a bracket part provided in the housing part and combined with the pedal part.

19. The pedal simulator apparatus of claim 18, wherein the bracket part is provided in plural in the housing part and the plurality of bracket parts are disposed on an outer surface of the housing part by being spaced apart from each other.

20. The pedal simulator apparatus of claim 17, further including:
    a hollow cap part combined with the piston part and interposed between the piston part and the damper part,
    wherein the cap part includes:
      a contact part coming in contact with a first part of the damper part to restrict deformation of the first part;

a non-contact part spaced apart from a second part of the damper part to allow deformation of the second part.

\* \* \* \* \*